(12) United States Patent
Luo

(10) Patent No.: US 11,271,806 B2
(45) Date of Patent: Mar. 8, 2022

(54) NETWORK CONFIGURATION METHOD OF INTERNET OF THINGS DEVICES AND RELATED DEVICES

(71) Applicant: SHENZHEN CHENBEI TECHNOLOGY CO., LTD., Shenzhen (CN)

(72) Inventor: Lei Luo, Shenzhen (CN)

(73) Assignee: SHENZHEN CHENBEI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/241,766

(22) Filed: Apr. 27, 2021

(65) Prior Publication Data

US 2021/0399943 A1 Dec. 23, 2021

(30) Foreign Application Priority Data

Jun. 18, 2020 (CN) .......................... 202010563142.4

(51) Int. Cl.
*G06F 15/177* (2006.01)
*H04L 41/0803* (2022.01)
*H04L 12/28* (2006.01)
*H04W 48/16* (2009.01)
*H04L 41/08* (2022.01)

(52) U.S. Cl.
CPC ...... *H04L 41/0803* (2013.01); *H04L 12/2807* (2013.01); *H04L 41/0889* (2013.01); *H04W 48/16* (2013.01)

(58) Field of Classification Search
CPC ............ H04L 41/0803; H04L 12/2807; H04L 41/0889; H04W 48/16
USPC .................................................. 709/203, 220
See application file for complete search history.

(56) References Cited

U.S. PATENT DOCUMENTS 9,913,143 B1 * 3/2018 Roche ................... H04W 12/50
2019/0116087 A1 * 4/2019 Hiller ...................... H04L 67/12
2019/0208024 A1 * 7/2019 Jablonski ................ H04L 69/18

* cited by examiner

Primary Examiner — Duyen M Doan
(74) Attorney, Agent, or Firm — Anova Law Group, PLLC

(57) ABSTRACT

A network configuration method for an IoT device is implemented by a terminal device. The method includes receiving attribute information broadcasted by N IoT devices, N being an integer greater than 1; determining a target IoT device from the N IoT devices based on at least one of: whether the attribute information broadcasted by the N IoT devices includes a selected identifier, or a first selection instruction input by a user; establishing a first communication connection with the target IoT device; sending a query request to the target IoT device to have the target IoT device return a network list corresponding to the target IoT device; determining a target network from the network list; and sending configuration information of the target network to the target IoT device so that the target IoT device performs network configuration based on the configuration information of the target network.

15 Claims, 8 Drawing Sheets

NETWORK CONFIGURATION METHOD OF INTERNET OF THINGS DEVICES AND RELATED DEVICES

CROSS-REFERENCE TO RELATED APPLICATION

This application claims priority to Chinese Patent Application No. 202010563142.4, filed on Jun. 18, 2020, the entire content of which is incorporated herein by reference.

TECHNICAL FIELD

The present disclosure relates to the field of Internet of Things (IoT), and more specifically, to a network configuration method of IoT devices and related devices.

BACKGROUND

Conventional Wi-Fi IoT devices are connected to the Internet through Wi-Fi wireless network. Before the IoT devices connect to the Internet through Wi-Fi, the IoT devices first need to be configured to connect to the wireless network.

The existing network configuration methods include a smart config method and an Access Point Name (APN) hotspot configuration method. In these two configuration methods, when there are multiple devices that need to be configured in the environment at the same time, the user cannot quickly determine which one of the devices that needs to be configured first in a terminal device, but can only identify different devices by matching the MAC address, or directly cut off the power of other devices that do not need network configuration, leaving the devices that needs to be configured. Therefore, the operation is complicated and affects the efficiency of the network configuration.

SUMMARY

One aspect of the present disclosure provides a network configuration method for an IoT device, implemented by a terminal device. The method includes receiving attribute information broadcasted by N IoT devices; determining a target IoT device from the N IoT devices based on at least one of: whether the attribute information broadcasted by the N IoT devices includes a selected identifier, or a first selection instruction input by a user; and establishing a first communication connection with the target IoT device. N is an integer greater than 1. The attribute information broadcasted by the N IoT devices includes a network configuration state, and the network configuration state of each of the N IoT devices is a network to-be-configured state. The method also includes: sending a query request to the target IoT device to have the target IoT device return a network list corresponding to the target IoT device; determining a target network from the network list; and sending configuration information of the target network to the target IoT device so that the target IoT device performs network configuration based on the configuration information of the target network.

Another aspect of the present disclosure provides a network configuration method implemented by an IoT device. The method includes: broadcasting attribute information of the IoT device, the attribute information including a network configuration state, the network configuration state of the IoT device being a network to-be-configured state; establishing a first communication connection with a terminal device; receiving a query request sent by the terminal device; sending a network list corresponding to the IoT device to the terminal device based on the query request to initiate the terminal device to determine a target network from the network list; and receiving configuration information of the target network returned by the terminal device, and performing network configuration based on the configuration information of the target network.

Another aspect of the present disclosure provides a terminal device that includes one or more processors; and a memory storing program instructions. The program instructions, when being executed by the one or more processors, cause the one or more processors to: receive attribute information broadcasted by N IoT devices; determine a target IoT device from the N IoT devices based on at least one of: whether the attribute information broadcasted by the N IoT devices includes a selected identifier, or a first selection instruction input by a user; and establishing a first communication connection with the target IoT device. N is an integer greater than 1. The attribute information broadcasted by the N IoT devices includes a network configuration state, and the network configuration state of each of the N IoT devices is a network to-be-configured state. The program instructions also cause the one or more processors to: send a query request to the target IoT device to have the target IoT device return a network list corresponding to the target IoT device; determine a target network from the network list; and send configuration information of the target network to the target IoT device so that the target IoT device performs network configuration based on the configuration information of the target network.

Another aspect of the present disclosure provides a terminal device that includes one or more processors; and a memory storing program instructions. The program instructions, when being executed by the one or more processors, cause the one or more processors to: broadcast attribute information of the IoT device, the attribute information including a network configuration state, the network configuration state of the IoT device being a network to-be-configured state; establish a first communication connection with a terminal device; receive a query request sent by the terminal device; send a network list corresponding to the IoT device to the terminal device based on the query request to initiate the terminal device to determine a target network from the network list; and receive configuration information of the target network returned by the terminal device, and perform network configuration based on the configuration information of the target network.

Another aspect of the present disclosure provides a non-transitory computer-readable storage medium storing program instructions that, when being executed by a processor, cause the processor to perform the network configuration method described above.

Other aspects of the present disclosure can be understood by those skilled in the art in light of the description, the claims, and the drawings of the present disclosure.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1:
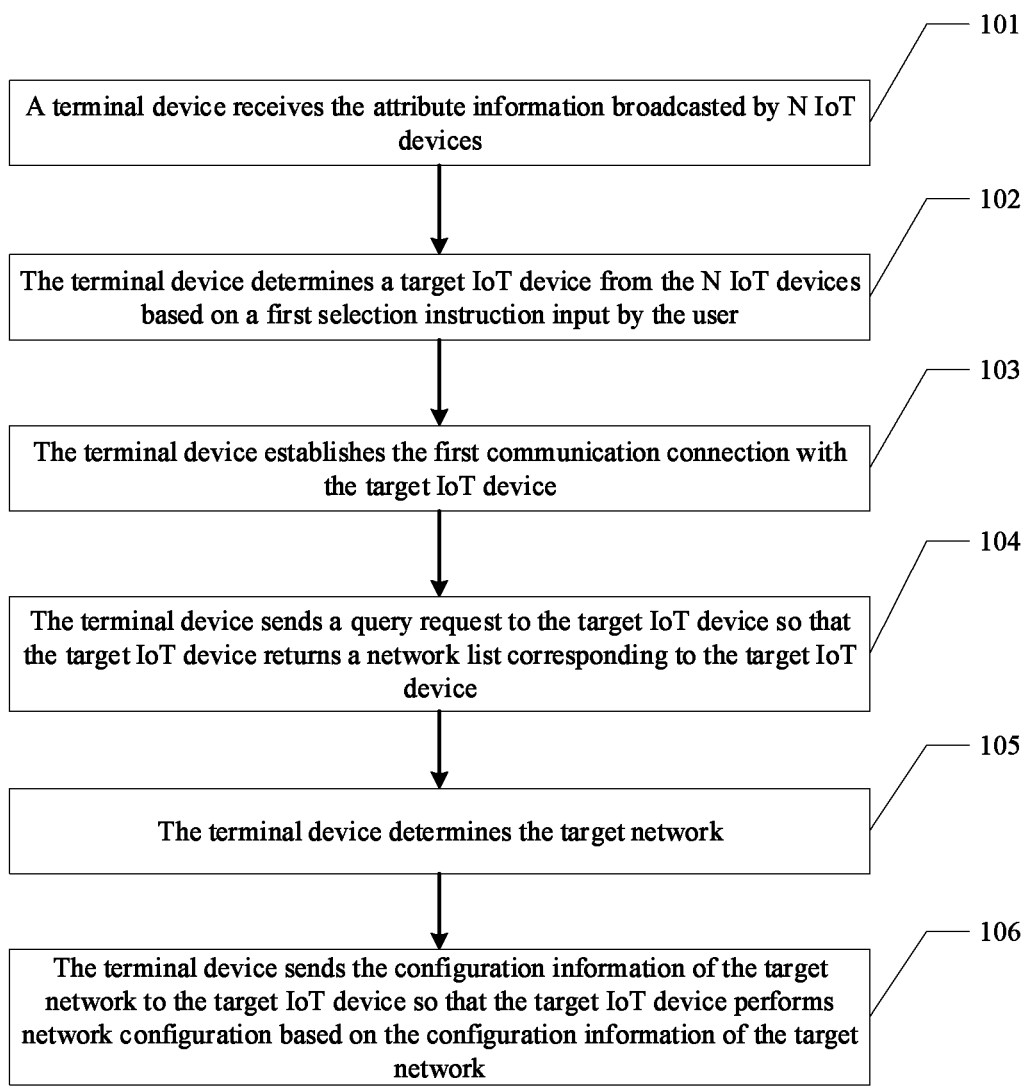
FIG. 1 is a flowchart of a network configuration method for IoT devices according to an embodiment of the present disclosure.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the specification, claims, and accompanying drawings of the present disclosure, the terms "first," "second," "third," "fourth," and the like (if exist) are intended to distinguish between similar objects but do not necessarily indicate an order or sequence. It should be understood that the data termed in such a way are interchangeable in proper circumstances so that the embodiments of the present disclosure described herein can be implemented, for example, in orders other than the order illustrated or described herein. Moreover, the terms "include," "contain" and any other similar expressions mean to cover the non-exclusive inclusion, for example, a process, method, system, product, or device that includes a list of steps or modules, and are not necessarily limited to those steps or modules that are explicitly listed, but may include other steps or modules not explicitly listed or inherent to such a process, method, system, product, or device.

The division of modules in the present disclosure is merely a logical function division and there may be other division in actual implementation. For example, multiple modules may be combined or integrated into another system, or some features can be omitted or not be executed. In addition, the mutual coupling, the direct coupling, or the communication connection as shown or discussed may be indirect coupling or communication connection through some interfaces, devices or units, and may be in electrical, mechanical or other forms, which is not limited in the present disclosure.

The modules or submodules described as separate components may or may not be physically separated. The modules or submodules may or may not be physical units, or it may also be distributed to multiple circuit modules. Some or all of the modules may be selected according to actual needs to achieve the objectives of the solution in the disclosure.

The network configuration method of the IoT devices provided in the embodiments of the present disclosure will be described below from the perspective of a terminal device.

It should be noted that the N IoT devices to be configured can be divided into the following two situations. In the first situation, there may be only one of the same device type in the N IoT devices to be configured. For example, the N IoT devices to be configured may include a refrigerator, an air conditioner, and a washing machine, and there may be only one IoT device of each same device type to be configured. In the second situation, there may be two or more of the IoT devices of each same device type to be configured. For example, the IoT devices to be configured may include a refrigerator 1, a refrigerator 2, a refrigerator 3, and an air conditioner, and there may be multiple IoT devices of the same device type to be configured.

In an application scenario where there is only one IoT device to be configured of the same device type, the implementation methods of the embodiments shown in FIG. 1 to FIG. 5 can be implemented and the user can quickly prioritize the IoT device that needs to be configured to improve the network configuration efficiency.

Figure 5:
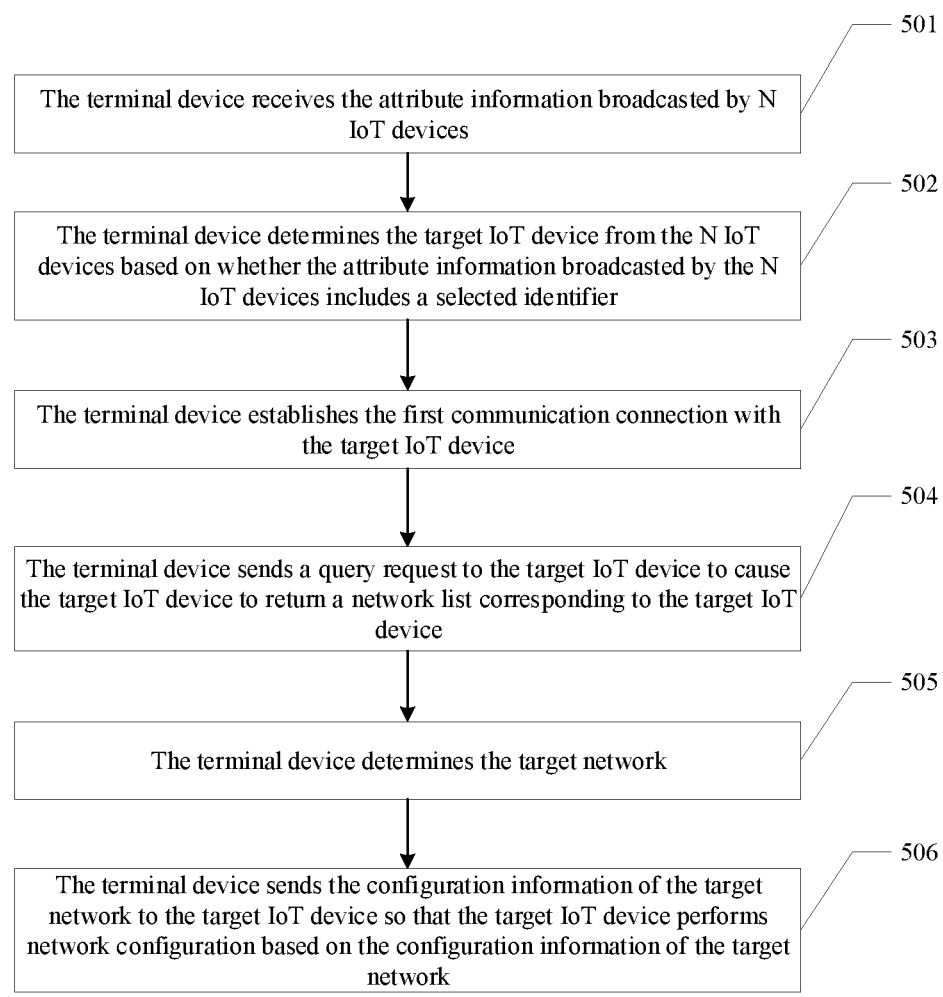
FIG. 5 is another flowchart of the network configuration method for IoT devices according to an embodiment of the present disclosure.

In an application scenario where there are two or more IoT devices to be configured of the same device type, the implementation method of the embodiment shown in FIG. 5 can be used to illustrate that the user can quickly determine the IoT device that needs to be configured first to improve the network configuration efficiency.

FIG. 1 is a flowchart of a network configuration method for IoT devices according to an embodiment of the present disclosure. The network configuration method will be described in detail below.

101, the terminal device receives the attribute information broadcasted by N IoT devices.

In one embodiment, the terminal may receive the attribute information broadcasted by N IoT devices, where N is a positive integer greater than or equal to two, the attribute information may include the network configuration state, and the network configuration of each of the N IoT devices may be a network to-be-configured state.

It should be noted that in order to establish a first communication connection between the terminal device and the IoT device to be configured, before the terminal device receives the attribute information broadcasted by the N IoT devices, the terminal device and the N IoT devices may both enable a first communication function (e.g., if the first communication connection is a Bluetooth connection, turning on the first communication function means turning on the Bluetooth function). As such, the IoT device with the enabled first communication function can broadcast its own attribute information. Correspondingly, the terminal device may receive the attribute information broadcasted by the IoT devices that have enabled the first communication function within a certain distance.

It should be noted that the attribute information broadcasted by each of the N IoT devices may also include a device type and a device identifier. In some embodiments, the device type may indicate a device category. For example, refrigerators and air conditioners belong to different device categories. Alternatively, the device type may indicate both device category and device model. For example, refrigerator type A1 and refrigerator type A2 may be different device models of the same device category. The device identifier may be used to represent the unique identification identifier of the IoT device. For example, the device identifier may be a media access control address (MAC address) and a product ID (PID), etc.

In addition to the network to-be-configured state, the network configuration state may also include a network-configured state. The network to-be-configured state may indicate that the IoT device is in the state of waiting for network configuration, and the IoT device in the network to-be-configured state may broadcast the attribute information. The network-configured state may indicate that the IoT device is in a state that the network has been successfully configured, and the successfully configured IoT device may not broadcast the attribute information. In some embodiments, an IoT device that has been configured, i.e., at the network-configured state, may be adjusted to the network to-be-configured state through a specific method (e.g., the user may press and hold the configured IoT device to control the IoT device to enter the network to-be-configured state).

102, the terminal device determines a target IoT device from the N IoT devices based on a first selection instruction input by the user.

In one embodiment, after receiving the attribute information broadcasted by the N IoT devices, the terminal device may determine the target IoT device from the N IoT devices based on a first selection instruction input by the user.

In some embodiments, when the terminal device determines that the attribute information of the N IoT devices does not include the target attribute information (i.e., no attribute information of the N IoT devices includes the selected identifier), the terminal device may show the N IoT devices to the user, the terminal device may receive the first selection instruction, and the terminal device may respond to the first selection instruction and determine the target IoT device based on the first selection instruction.

In some embodiments, the operation of generating the first selection instruction described above may include one or more of a gesture operation, a sliding operation, a click operation, or a voice control operation. For example, when the user clicks on icons representing the N IoT devices displayed on the terminal device, the terminal device can receive the click operation. At this time, the click operation can generate the first selection instruction. In addition, the operation of generating the first selection instruction and identifying the target IoT device performed on the terminal device can be pre-defined. For example, the sliding operation (e.g., sliding left operation, sliding right operation, sliding up operation, sliding down operation, etc.) may be pre-defined as the operation of selecting/identifying the target IoT device, or the click operation (e.g., single click, double-click, etc.) may be pre-defined as the operation of selecting the target IoT device, or the gesture operation (e.g., swinging the wrist or arm to the left, swinging the wrist or arm to the right, contracting four fingers, sliding three fingers up, etc.) may be pre-defined as the operation of selecting the target IoT device, or the voice control operation (e.g., receiving the voice instruction of selecting the target IoT device) may be pre-defined as the operation of selecting the target IoT device. The foregoing is merely an example, and is not a limitation on the operation of generating the first selection instruction. Therefore, the first selection instruction can be used to determine the IoT device selected by the user in the display interface of the terminal device, and then the terminal device can determine the IoT device selected by the user in the N IoT devices as the target IoT devices.

Figure 2:
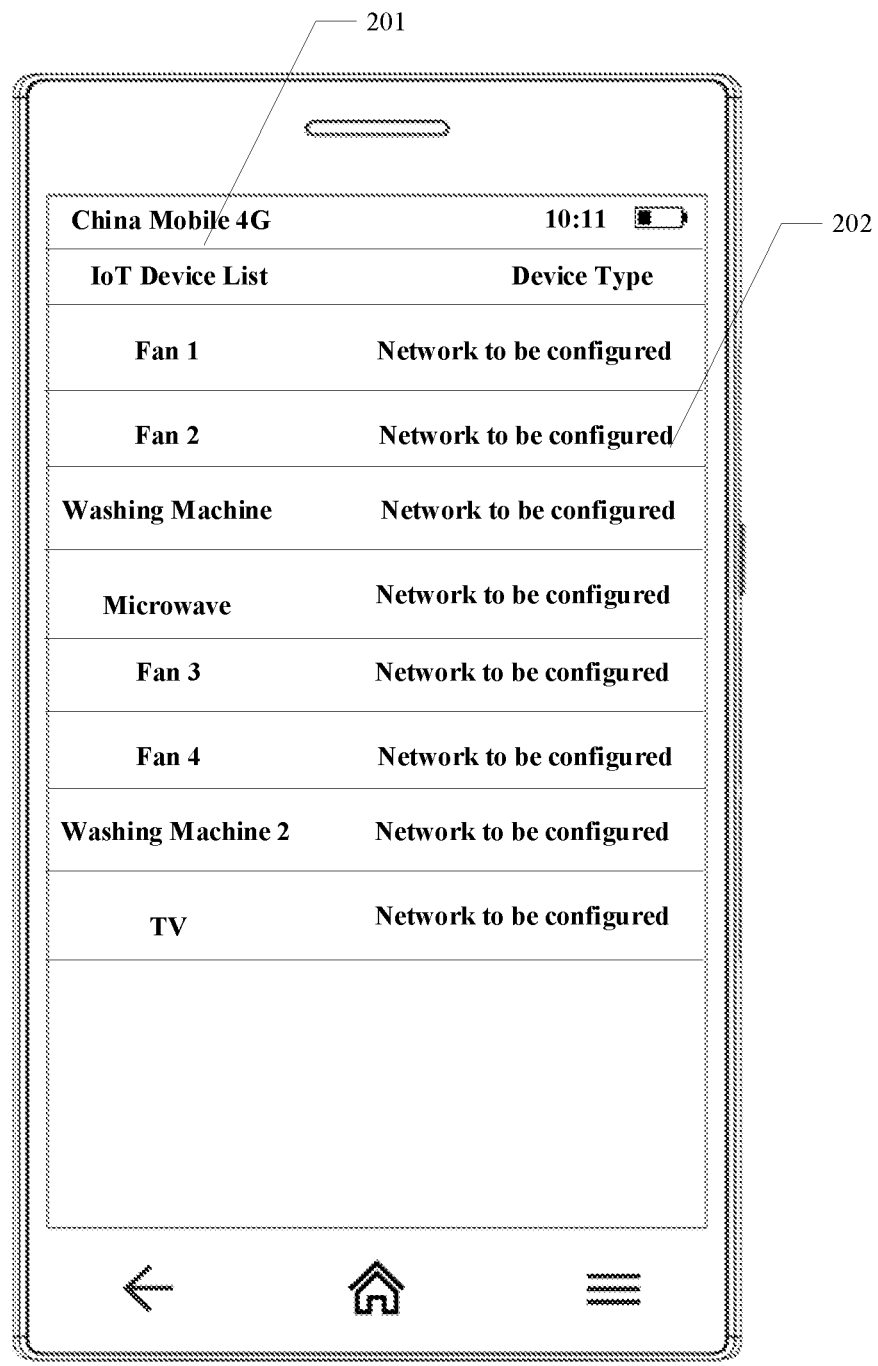
FIG. 2 is a schematic diagram of an interface display according to an embodiment of the present disclosure.

The display of N IoT devices by the terminal device will be described below with reference to FIG. 2 and FIG. 3. FIG. 2 is a schematic diagram of an interface display according to an embodiment of the present disclosure, and FIG. 3 is another schematic diagram of the interface display according to an embodiment of the present disclosure.

Referring to FIG. 2, which is a schematic diagram of a page showing the IoT device corresponding to the receive attribute information in an automatic search interface of the terminal device. FIG. 2 includes an IoT device list 201, and a network configuration state list 202 of the corresponding IoT devices (of course, it may also include other information of the IoT device, such as the device identifier, which is not limited herein).

Figure 3:
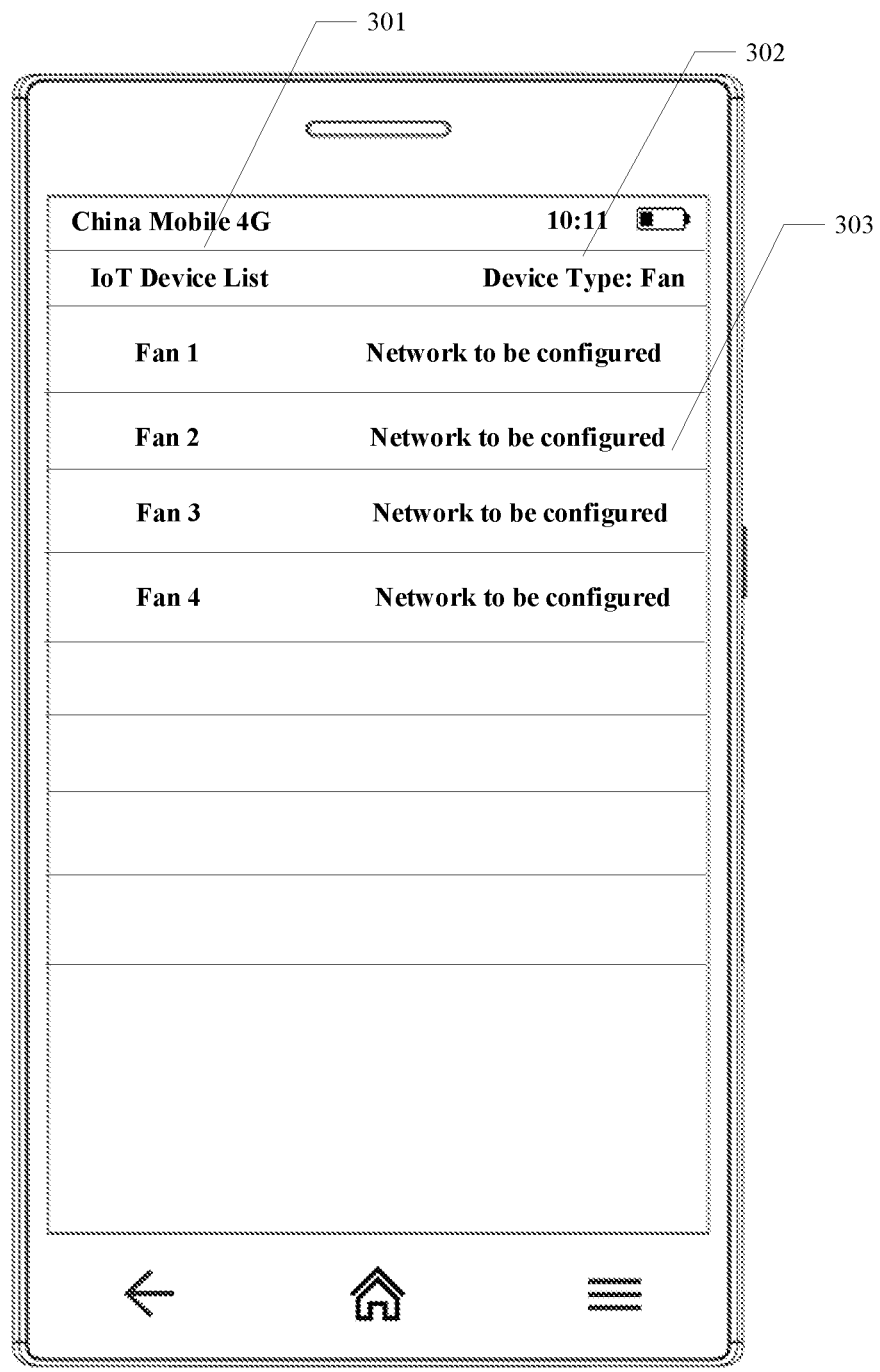
FIG. 3 is another schematic diagram of the interface display according to an embodiment of the present disclosure.

Referring to FIG. 3, which is a schematic diagram of a page displaying the IoT devices of the target device type screened out by the terminal device from the IoT devices corresponding to the received attribute information after the user selects the target device type. FIG. 3 includes an IoT device list 301, a target device type 302 (fan type selected by the user), and a network configuration state list 303 of the corresponding IoT devices under the target device type 302 that are discovered and need to be configured in the network. FIG. 2 and FIG. 3 are merely examples, and are not limitations of the present disclosure.

103, the terminal device establishes the first communication connection with the target IoT device.

In one embodiment, after the terminal device determines the target IoT device, it may establish a first communication connection with the target IoT device. For example, the terminal device may perform Bluetooth pairing with the target IoT device, and establish a Bluetooth connection after a successful pairing.

It should be noted that the first communication connection described in embodiments of the present disclosure may be any suitable short-range wireless connection method (e.g., Zigbee, infrared, Bluetooth, etc.), which is not limited herein.

In some embodiments, the terminal device may determine whether the target IoT device is bound to an associated account. When the terminal device determines that the target IoT device is bound to an associated account, the terminal device may determine whether the associated account bond to the target IoT device matches the current account. When the terminal device determines that the associated account bound to the target IoT device matches the current account, the terminal device may send a first prompt message. The first prompt message may be used to indicate whether to perform a reset operation on the target IoT device. When the first communication connection determines that the associated account bond to the target IoT device does not match the current account, the terminal device may send a second prompt message. The second prompt message may be used to instruct to perform a reset operation on the target IoT device.

In a specific implementation, after the terminal device establishes the first communication connection with the target IoT device, the terminal device may determine whether the target IoT device is bound to the associated account. More specifically, the terminal device may store a mapping table between each user account that has logged in and the device ID bound to each account. By matching the device ID of the target IoT device with the mapping table, whether the target IoT device is bound to the associated account can be determined.

When the target IoT device is bound to the associated account, the network configuration processes at 104 to 106 can be performed.

When the terminal device determines that the target IoT device has been bound to the associated account, it may indicate that the target IoT device is an IoT device that has been previously configured. At this time, the terminal device may determine whether the associated account bond to the target IoT device matches the current account of the terminal device (i.e., determine whether the associated account previously bound to the target IoT device is the same as the current account of the terminal device, or whether it is an associated account). When the terminal device determines that the associated account bound to the target IoT device matches the current account, the terminal device may send out the first prompt message. The first prompt message may be used to prompt the user whether to perform a reset operation on the target IoT device. When the terminal device determines that the associated account bound to the target IoT device does not match the current account, the terminal device may send out the second prompt message. The second prompt message may be used to prompt the terminal device to perform a reset operation on the target IoT device if the user wants to continue the network configuration for the target IoT device. That is, when the target IoT device is a network-configured IoT device, and the account associated with the target IoT device does not match the current account of the terminal device, the target IoT device may need to be reset.

It can be understood that after sending the first prompt message or the second prompt message, the terminal device may receive the user's operation instruction, and perform a corresponding operation based on the user's operation instruction.

For example, when the first prompt message is sent out, the user may choose to perform the reset operation on the target IoT device, or choose not to perform the rest operation on the target IoT device. When the reset operation is selected, the associated account bound to the target IoT device may be erased.

For example, when the second prompt message is sent out, the user can confirm performing the reset operation if he/she needs to continue the network configuration of the terminal device.

For the foregoing situation where the reset operation is determined to be performed, the terminal device may send the reset instruction and the query request in the process at 104 to the target IoT device separately or together. Correspondingly, after the target IoT device receives the reset instruction, the terminal device may delete the previous user data and restore the factory settings.

It should be noted that resetting the IoT device may include deleting the parameter settings and more settings of the configured network. For example, parameter settings of an air fryer may include a corresponding default working mode and working temperature, etc.

It can be understood that after the IoT device that has been configured in the network is reset, it may become an IoT device in the factory default state, and its network configuration state may be adjusted to the network to-be-configured state. After the process at 106, if the network configuration is successful, the network configuration state is then adjusted to the network-configured state.

104, the terminal device sends a query request to the target IoT device so that the target IoT device returns a network list corresponding to the target IoT device.

In this embodiment, after determining the target IoT device, the terminal device may send a query request to the target IoT device, and the target IoT device may return a network list corresponding to the target IoT device. That is, the terminal device needs to know the available network list corresponding to the target IoT device. The network list may include, but is not limited to, the network name, the signal strength of each network, and the encryption method of each network. Correspondingly, after receiving the query request, the target IoT device may search the wireless network to obtain a network list. The network list described above may be a wireless network using a second communication connection technology, which may include, but is not limit to, Wi-Fi. The second communication connection technology may be different from the first communication connection technology. Taking Wi-Fi as an example, since the terminal device obtains the list of available Wi-Fi from the target IoT device, the terminal device may freely select the network that needs to be paired for the target IoT device. The Wi-Fi signal is for the target IoT device rather than the terminal device to help the user choose a network that is more suitable for the target IoT device. Further, since the network frequency band searched by the target IoT device is suitable for its own network frequency band, the network configuration failure caused by the wrong network selection can be avoided. For example, assume that the target IoT device is only suitable for a 2.4 GHz network, if the user directly configures the network, it is likely that a 5 GHz network is configured to the target IoT device, resulting in network configuration failure. By using the method in this embodiment, this type of network configuration failure can be avoided.

105, the terminal device determines the target network.

In one embodiment, after obtaining the network list, the terminal device may determine the target network, which belongs to the network list. The way the terminal device determines the target network is not specifically limited here. For example, the terminal device may select the network with the best network signal as the target network based on the network list. Alternatively, the terminal device may display the network list to the user after obtaining the network list, receive the user's selection instruction of the network list, and determine the target network based on the user's selection instruction. Of course, other methods can be used, as long as the target network can be determined.

106, the terminal device sends the configuration information of the target network to the target IoT device so that the target IoT device performs network configuration based on the configuration information of the target network.

In one embodiment, after the terminal device determines the target network, the configuration information of the target network can be determined and sent to the target IoT device and the target IoT device can perform network configuration based on the configuration information of the target network (the configuration information of the target network may include the network identifier and the network password. The configuration information of the target network can be stored in advance by the terminal device, or the terminal device may display the target network and receive the configuration information input by the user, which is not limited in the embodiments of the present disclosure). Correspondingly, the target IoT device can perform the network configuration based on the configuration information.

Therefore, in the embodiments of the present disclosure, when there are multiple devices that need to be networked, the terminal device can quickly determine the device that needs to be configured first (i.e., the target device being prioritized) from N IoT devices based on the first selection instruction input by the user, thereby reducing the complexity of the network configuration of the IoT devices, and improving the network configuration efficiency.

Figure 4:
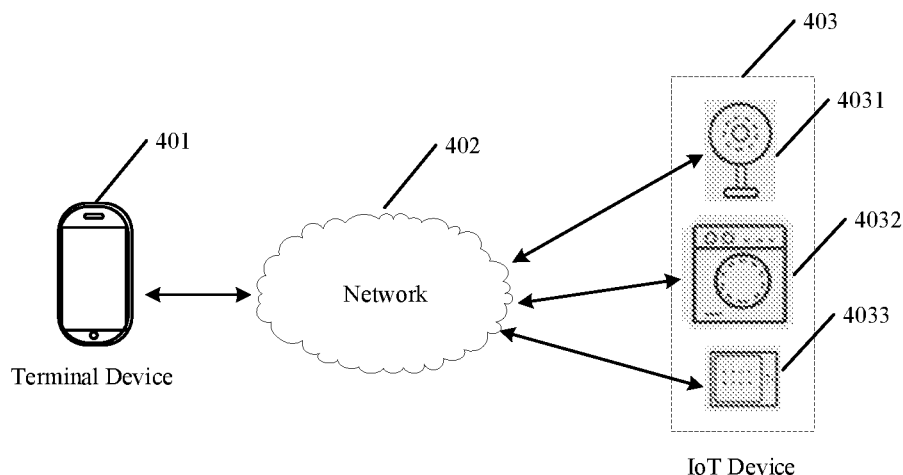
FIG. 4 is a schematic diagram of a scenario of the network configuration method for IoT devices according to an embodiment of the present disclosure.

FIG. 4 is a schematic diagram of a scenario of the network configuration method for IoT devices according to an embodiment of the present disclosure. FIG. 4 includes a terminal device 401, a network 402, and an IoT device 403. In this example, N=3. That is, three IoT devices, fan 4031, washing machine 4032, and microwave 4033 are taken as examples. The fan 4031, the washing machine 4032, and the microwave 4033 are in the network to-be-configured state, and their respective attribute information is broadcasted. The attribute information may include the network configuration state. After receiving the attribute information broadcasted by the three IoT devices, the terminal device may show the three IoT devices to the user, receive the user's first selection instruction, and determine the target IoT device from the first selection instruction. For example, the fan 4031 may be the target IoT device selected by the user, and the terminal device 401 and the fan 4031 may perform Bluetooth pairing. After the a successful Bluetooth pairing, a query request may be sent to the fan 4031 so that the fan 4031 returns the network list corresponding to the fan 4031. Then the terminal device 401 may determine the target network from the network list, configure the configuration information of the target network, such as user name, password, and other information, and send the configuration information to the fan 4031. After the fan 4031 successfully configures the network based on the configuration information of the target network, the target IoT device may communicate with other devices through the network 402. As a result, the terminal device can quickly prioritize the device that needs to be connected to the network first when there are multiple devices that need to be configured, thereby reducing the complexity of network configuration of IoT devices, and improving the efficiency of network configuration.

FIG. 5 is another flowchart of the network configuration method for IoT devices according to an embodiment of the present disclosure. The network configuration method will be described in detail below.

501, the terminal device receives the attribute information broadcasted by N IoT devices.

It should be noted that the process at 501 in FIG. 1 is similar to the process at 101 in FIG. 1, which has been described in detail above, and will not be repeated here.

502, the terminal device determines the target IoT device from the N IoT devices based on whether the attribute information broadcasted by the N IoT devices includes a selected identifier.

In one embodiment, after receiving the attribute information broadcasted by the N IoT devices, the terminal device may determine whether target attribute information exists in the attribute information of the N IoT devices, the target attribute information being attribute information of an IoT device that includes the selected identifier. When the attribute information broadcasted by the N IoT devices includes the selected identifier of the target attribute information (i.e., when the terminal device determines that the target attribute information is included in the attribute information of the N IoT devices), the IoT device corresponding to the target attribute information may be determined as the target IoT device. In some embodiments, the attribute information including the selected identifier may be sent by the IoT device preferred by the user. That is, the selected identifier may be added to the broadcasted attribute information to the IoT device that is preferentially selected by the user. After receiving the N pieces of attribute information, the terminal device may extract the attribute information with the selected identifier therefrom, then the target IoT device can be directly determined.

In some embodiments, in addition to the terminal device directly determining the target IoT device, the terminal device may also display the received attribute information of the N IoT devices on the display interface. The attribute information including the selected identifier may be displayed differently. After the user intuitively selects and confirms the IoT device corresponding to the differentiated attribute information to preferentially configure the network, the terminal device may determine the target IoT device.

It should be noted that in some embodiments, the selected identifier may be carried by the IoT device itself, and the selected identifier is one type of selection identifiers. The selection identifiers may also include an unselected identifier. More specifically, whether the IoT device is selected or not can be determined by setting the value of a selection identifier. For example, 1 may indicate the selected identifier, and 0 may indicated the unselected identifier. That is, each of the attribute information broadcasted by the N IoT devices may include a selection identifier, but only the attribute information including the selected identifier is sent by the IoT device preferentially selected by the user. In another possible implementation, the selected identifier may also be added to the attribute information of the IoT device. That is, in the attribute information broadcasted by the N IoT devices, there may be attribute information that includes the selected identifier and attribute information that does not include the selected identifier, which is not limited in the embodiments of the present disclosure, as long as the IoT device selected by the user can be distinguished from other IoT devices in the N IoT devices.

The embodiments of the present disclosure do not specifically limit the method of adding the selected identifier and/or the unselected identifier to the attribute information. Taking the selected identifier as an example, for instance, after the terminal device obtains N pieces of attribute information broadcasted by the N IoT devices, the terminal device may display a list of the N IoT devices to the user through an application. Then the terminal device may guide the user to identify the IoT devices to be configured. For example, based on the prompt information provided by the terminal device, a press and hold operation may be performed on a desired IoT device to be prioritized for network configuration. Subsequently, the attribute information broadcasted by the IoT device to be configured can carry the selected identifier. Of course, other methods can also be used, which are not limited in the embodiments of the present disclosure, as long as the selected/unselected identifier can be added to the attribute information such that the terminal device can determine the target IoT device.

In some embodiments, when the terminal device determines that the target attribute information that includes the selected identifier does not exist in the attribute information of the N IoT devices (i.e., when the terminal device determines that the attribute information of the N IoT devices does not include the target attribute information), the terminal device may display the N IoT devices.

In some embodiments, when the terminal device determines that the target attribute information that includes the selected identifier does not exist in the attribute information of the N IoT devices (i.e., when the terminal device determines that the attribute information of the N IoT devices does not include the target attribute information), the terminal device may display the N IoT devices. The terminal device may receive the first selection instruction, respond to the first selection instruction, and determine the target IoT device based on the first selection instruction. For the detailed description of the first selection instruction, reference may be made to the corresponding description in the embodiment of FIG. 1, which will not be repeated here.

In some embodiments, when the terminal device does not receive the first selection instruction within a predetermined period of time, and there are two or more devices of the same device type in the N IoT devices, the terminal device may output prompt message for prompting the user to provide an instruction on limited IoT device(s) for network configuration, thereby determining the IoT device preferred by the user. For the detailed description of the first selection instruction, reference may be made to the corresponding description in the embodiment of FIG. 1, which will not be repeated here.

In this embodiment, when the terminal device determines that the target attribute information that includes the selected identifier does not exist in the attribute information of the N IoT devices (i.e., when the terminal device determines that the attribute information of the N IoT devices does not include the target attribute information), the terminal device may display the N IoT devices to the user for viewing, such that the user can select the IoT device that needs to be configured first. Subsequently, the terminal device may monitor in real time whether it receives the user's first selection instruction in a predetermined period of time (e.g., within 20 seconds, of course the predetermined period of time can be other time lengths, which are not limited in the embodiments of the present disclosure). When the first selection instruction is not received within the predetermined period of time, and there are two or more devices of the same device type or the same device identifier in the N IoT devices, the terminal device may output a prompt message. The prompt message can be used to prompt user to provide an operation instruction on the IoT device that needs to be configured first, and determine the IoT device preferred by the user. For the detailed description of the prompt message, reference may be made to the method of adding the selected/unselected identifier to the attribute information, which will not be repeated here.

503, the terminal device establishes the first communication connection with the target IoT device.

504, the terminal device sends a query request to the target IoT device so that the target IoT device returns a network list corresponding to the target IoT device.

505, the terminal device determines the target network.

506, the terminal device sends the configuration information of the target network to the target IoT device so that the target IoT device performs network configuration based on the configuration information of the target network.

It should be noted that the processes at 503 to 506 are similar to the processes at 103 to 106 in FIG. 1, which has been described in detail in FIG. 1 and will not be repeated here.

Therefore, it can be seen that in the embodiments of the present disclosure, in the case where there are multiple devices that need to be networked, the terminal device can determine the target IoT device from the N IoT devices based on whether the attribute information broadcasted by the N IoT devices includes the selected identifier. As such, the device that needs to be configured first can be quickly identified, thereby reducing the complexity of the network configuration of the IoT devices, and improving the efficiency of the network configuration.

Figure 6:
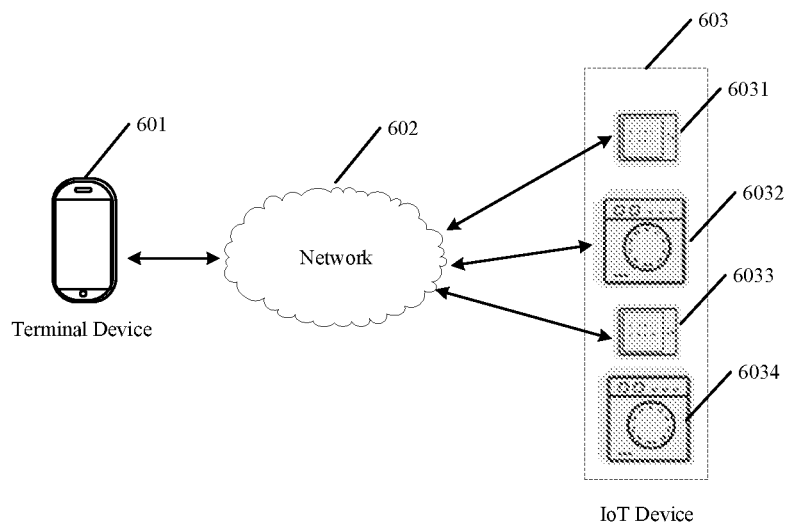
FIG. 6 is a schematic diagram of another scenario of the network configuration method for IoT devices according to an embodiment of the present disclosure.

FIG. 6 is a schematic diagram of another scenario of the network configuration method for IoT devices according to an embodiment of the present disclosure. FIG. 6 includes a terminal device 601, a network 602, and IoT devices 603. In this example, N=4. That is, there are four IoT devices: microwave 6031, washing machine 6032, microwave 6033, and washing machine 6034, where the microwave 6031 and the microwave 6033 are two IoT devices with the same device type, and the washing machine 6032 and the washing machine 6034 are two IoT devices with the same device type.

The microwave 6031, the washing machine 6032, the microwave 6033, and the washing machine 6034 may respectively broadcast their respective attribute information. The attribute information may include the network state. The attribute information broadcasted by the microwave 6031 may carried the selected identifier, which indicates that the microwave 6031 is the IoT device preferentially selected by the user. In operation, the terminal device 601 may receive the respective attribute information broadcasted by the microwave 6031, washing machine 6032, microwave 6033, and washing machine 6034, and may determine the target IoT device based on whether the broadcasted attribute information includes the selected identifier. In this example, the terminal device 601 may determine that the attribute information broadcasted by the microwave 6031 carries the selected identifier, and the microwave 6031 can be determined as the target IoT device. Then the terminal device 601 may perform Bluetooth pairing with the microwave 6031, and after the Bluetooth pairing is successful, a query request can be sent to the microwave 6031 and the microwave 6031 can return a network list corresponding to the microwave 6031. Then, the terminal device 601 may determine that target network from the network list, configure the configuration information of the target network, such as user name, password, and other information, and send the configuration information to the microwave 6031, such that after the microwave 6031 successfully configures the network based on the configuration information of the target network, the target IoT device can communicate with other devices through the target network (the second communication connection). As a result, the terminal device can quickly prioritize the device that need network configuration when there are multiple devices that need to be configured, thereby reducing the complexity of network configuration of IoT devices, and improving the efficiency of network configuration.

It should be noted that the above description of the two different methods of determining the target IoT device are in conjunction with FIG. 1 and FIG. 5. In practical applications, one method may be used to determine the target IoT device based on the actual situation, or two methods may be used together to determine the target IoT device, which is not limited in the embodiments of the present disclosure.

The above description describes the network configuration method of the IoT device provided in the embodiments of the present disclosure from the perspective of the terminal device. The following description describe the network configuration method of the IoT device provided in the embodiments of the present disclosure from the perspective of the IoT device.

Figure 7:
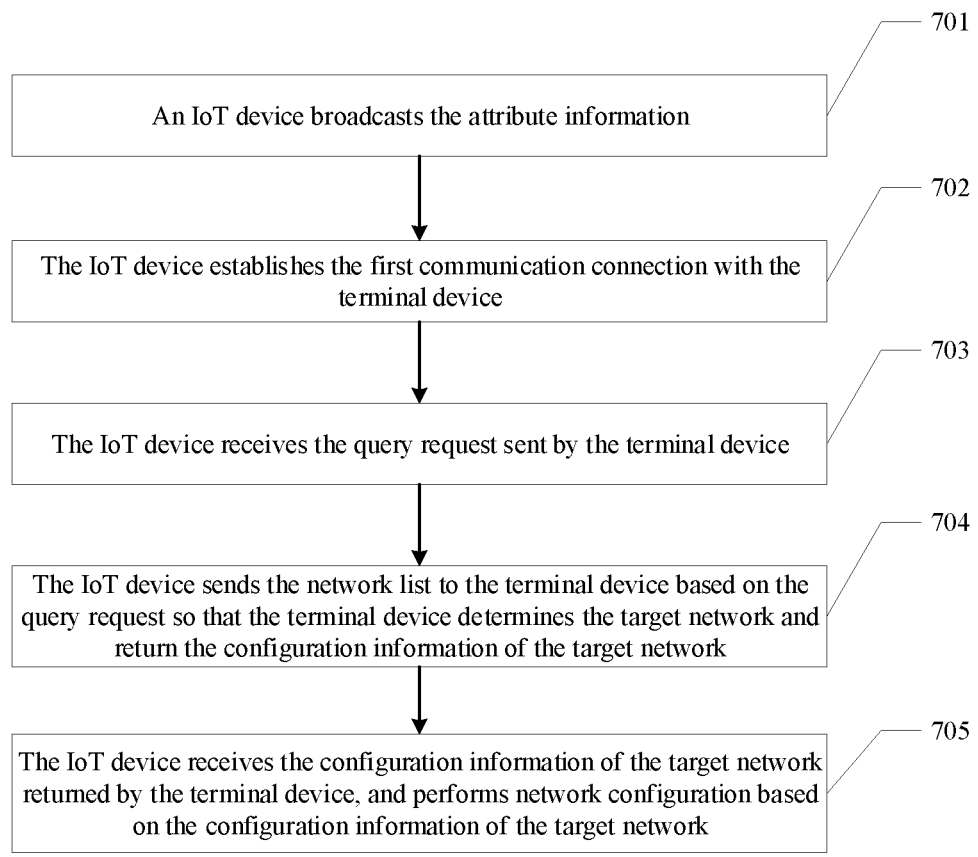
FIG. 7 is another flowchart of the network configuration method for IoT devices according to an embodiment of the present disclosure.

FIG. 7 is another flowchart of the network configuration method for IoT devices according to an embodiment of the present disclosure. The network configuration method will be described in detail below.

701, the IoT device broadcasts the attribute information.

In one embodiment, the IoT devices may broadcast the attribute information. The attribute information may include the network configuration state, and the network configuration state of the IoT device may be the network to-be-configured state.

It should be noted that the target attribute information broadcasted by the IoT device may also include the device type and the device identifier. In some embodiments, the device type may indicate a device category. For example, refrigerators and air conditioners belong to different device categories. Alternatively, the device type may indicate both device category and device model. For example, refrigerator type A1 and refrigerator type A2 may be different device models of the same device category. The device identifier may be used to represent the unique identification identifier of the IoT device. For example, the device identifier may be a media access control address (MAC address) and a product ID (PID), etc. In addition, the network configuration state may not only include the network to-be-configured state, but may also include the network-configured state. The IoT device in the network to-be-configured state may broadcast the attribute information. The IoT device in the network-configured state may indicate the IoT device is in a state that the network has been successfully configured, and the IoT device whose network has been successfully configured may not broadcast the attribute information. It can be understood that the network-configured state may be used to indicate whether the IoT device is in the state of that has been configured or waiting to be configured. In some embodiments, an IoT device that has been configured, i.e., at the network-configured state, may be adjusted to the network to-be-configured state through a specific method (e.g., the user may press and hold the configured IoT device to control the IoT device to enter the network to-be-configured state again).

In some embodiments, during the process of broadcasting the attribute information of the IoT device, or before the IoT device broadcasts the attribute information, the IoT device may receive the first operation instruction, respond to the first operation instruction, and add the selected identifier to the attribute information based on the first operation instruction to generate the target attribute information, and broadcast the target attribute information.

In one embodiment, the IoT device can receive the user's first operation instruction, add the selected identifier to the attribute information based on the first operation instruction, obtain the target attribute information, and broadcast the target attribute information. That is, the purpose of the user's first operation instruction is to add the selected identifier to a certain attribute information broadcasted by the IoT device. As such, the terminal device may determine the target attribute information from the attribute information broadcasted by the multiple IoT devices based on the selected identifier, and then determine the target IoT device.

In some embodiments, the operation of generating the first operation instruction described in the above embodiment may include one or more of a gesture operation, a sliding operation, a click operation, and a voice control operation. For example, when the user clicks on the IoT device (e.g., selects a virtual button on a touch screen of the IoT device or press a physical button on the IoT device), the IoT device may add the selected identifier to the attribute information based on the first operation instruction to obtain the target attribute. In addition, the operating instruction of adding the selected identifier performed on the IoT device may be pre-defined (e.g., by a user operation on a control panel interface of the IoT device, and/or by a manufacturer of IoT device and indicated in a user manual of the IoT device), such as defining the sliding operation as the operation of adding the selected identifier to the attribute information to obtain the target attribute information (e.g., sliding left operation, sliding right operation, sliding up operation, sliding down operation, etc.), or the click operation may be pre-defined as the operation of adding the selected identifier to the attribute information to obtain the target attribute information (e.g., single click, double-click, etc.), or the gesture operation may be pre-defined as the operation of adding the selected identifier to the attribute information to obtain the target attribute information (e.g., swinging the wrist or arm to the left, swinging the wrist or arm to the right, contracting four fingers, sliding three fingers up, etc.), or the voice control operation may be pre-defined as the operation of adding the selected identifier to the attribute information to obtain the target attribute information (e.g., receiving the voice of adding the selected identifier to a certain attribute information). The foregoing is merely an example, and is not a limitation on the operation of generating the first operation instruction. Therefore, the first operation instruction can be used to add the selected identifier to the attribute information, and then determine the attribute information to which the selected identifier is added as the target attribute information.

It should be noted that for the possible implementation of the selected identifier, reference may be made to the description of the process at 502 above, which will not be repeated here.

In some embodiments, before the IoT device broadcasts the attribute information, when the network configuration state of the IoT device is the network-configured state, the IoT device may receive a second operation instruction. The second operation instruction may be used to adjust the network configuration state of the target IoT device. The IoT device may respond to the second operation instruction and adjust the network configuration state of the IoT device to the network to-be-configured state.

In one embodiment, the method of generating the second operation instruction may be similar to the method of generating the first operation instruction, which has been described in detail above, and will not be repeated here.

It should be noted that there may be two states of the first communication connection function of the IoT devices that have been configured. In the first state, the first communication connection function may be constantly on after power-on. In the second state, the first communication connection function may be turned on after power-on, and the first communication connection function may be turned off after the network is successfully configured. In the case of the first state, if the configured IoT device need to be reconfigured, then the network configuration state of the IoT device may need to be adjusted to the network to-be-configured state, and the process at 701 and the subsequent processes can be performed. In the case of the second state, if the configured IoT device need to be reconfigured, then the network configuration state of the IoT device may need to be adjusted to the network to-be-configured state, the IoT device may need to be operated to enable the first communication connection function, and the perform the process at 701 and the subsequent processes.

702, the IoT device establishes the first communication connection with the terminal device.

In one embodiment, after the IoT device broadcast the attribute information, if the IoT device is the device selected by the user for network configuration, the first communication connection may be established with the terminal device. For example, the IoT device and the terminal device may establish a Bluetooth connection through Bluetooth pairing. Of course, other types of short-range wireless connections may also be used, which are not limited in the embodiments of the present disclosure.

703, the IoT device receives the query request sent by the terminal device.

In one embodiment, after the terminal device establishes the first communication connection, the IoT device may receive a query request sent by the terminal device. The query request may be used to instruct the IoT device to search for a list of available networks and return the list of available networks to the terminal device.

704, the IoT device sends the network list to the terminal device based on the query request so that the terminal device determines the target network and return the configuration information of the target network.

In one embodiment, after receiving the query request, the IoT device may search the wireless network to obtain a network list. The network list described above may be a wireless network using a second communication connection technology, which may include, but is not limit to, Wi-Fi. Taking Wi-Fi as an example, since the terminal device obtains the list of available Wi-Fi name(s) from the target IoT device, the terminal device may freely select the network that the target IoT device needs to be paired with. The Wi-Fi signal is for the target IoT device rather than the terminal device to help the user choose a network that is more suitable for the target IoT device. Further, since the network frequency band searched by the target IoT device is suitable for its own network frequency band, the network configuration failure caused by the wrong network selection can be avoided. For example, assume that the target IoT device is only suitable for a 2.4 GHz network, if the user directly configures the network, it is likely that a 5 GHz network may be configured to the target IoT device, resulting in network configuration failure. By using the method in this embodiment, this type of network configuration failure can be avoided.

705, the IoT device receives the configuration information of the target network returned by the terminal device, and performs network configuration based on the configuration information of the target network.

In one embodiment, after the IoT device receives the configuration information of the target network sent by the terminal device (the configuration information of the target network may include the network identifier and the network password. The configuration information of the target network can be stored in advance by the terminal device, or the terminal device may show the target network to the user and receive the configuration information input by the user, which is not limited in the embodiments of the present disclosure), the IoT device may perform network configuration based on the configuration information.

In some embodiments, the target IoT device may provide connection feedback information to the terminal device through the first communication connection. The connection feedback information may include information such as successful network configuration, unsuccessful network configuration, or connection timeout. When the connection feedback information is that the network configuration is successful, it may indicate that the IoT device can access the server through the target network, such that the target IoT device can also communicate with the terminal device through the server, and the connection that the target IoT device communicates with the terminal device or the server through the network may become the second communication connection. When the connection feedback information is that the network configuration is unsuccessful or the connection is timed out, a prompt message can be sent and an error log can be recorded. The prompt message may prompt the user that there is an issue with the network configuration of the target IoT device for the user to address.

In some embodiments, when a network of the IoT device is successfully configured, the IoT device's network configuration can be adjusted to the network-configured state.

In one embodiment, when the IoT device is successfully networked, the network configuration state of the IoT device can be adjusted to the network-configured state. In some embodiments, the first communication connection function of the network-configured IoT device can also be turned off.

Therefore, it can be seen that in the embodiments of the present disclosure, the networked device can be re-configured without resetting, which preserves user data and improves network configuration efficiency. In addition, when there are multiple devices that need to be networked, the selected identifier can be added to the attribute information sent by the preferred IoT device to be networked in response to the user's operation on the preferred IoT device to be networked. As such, the user can quickly determine the preferred IoT device for network configuration, reduce the complexity of the network configuration of the IoT device, and improve the efficiency of network configuration.

The foregoing description describes the network configuration method of the IoT device provided in the embodiments of the present disclosure from the perspective of the terminal device and the IoT device. The following description describes the network configuration method of the IoT device provided in the embodiments of the present disclosure from the perspective of the interaction between the terminal device and the IoT device.

Figure 8:
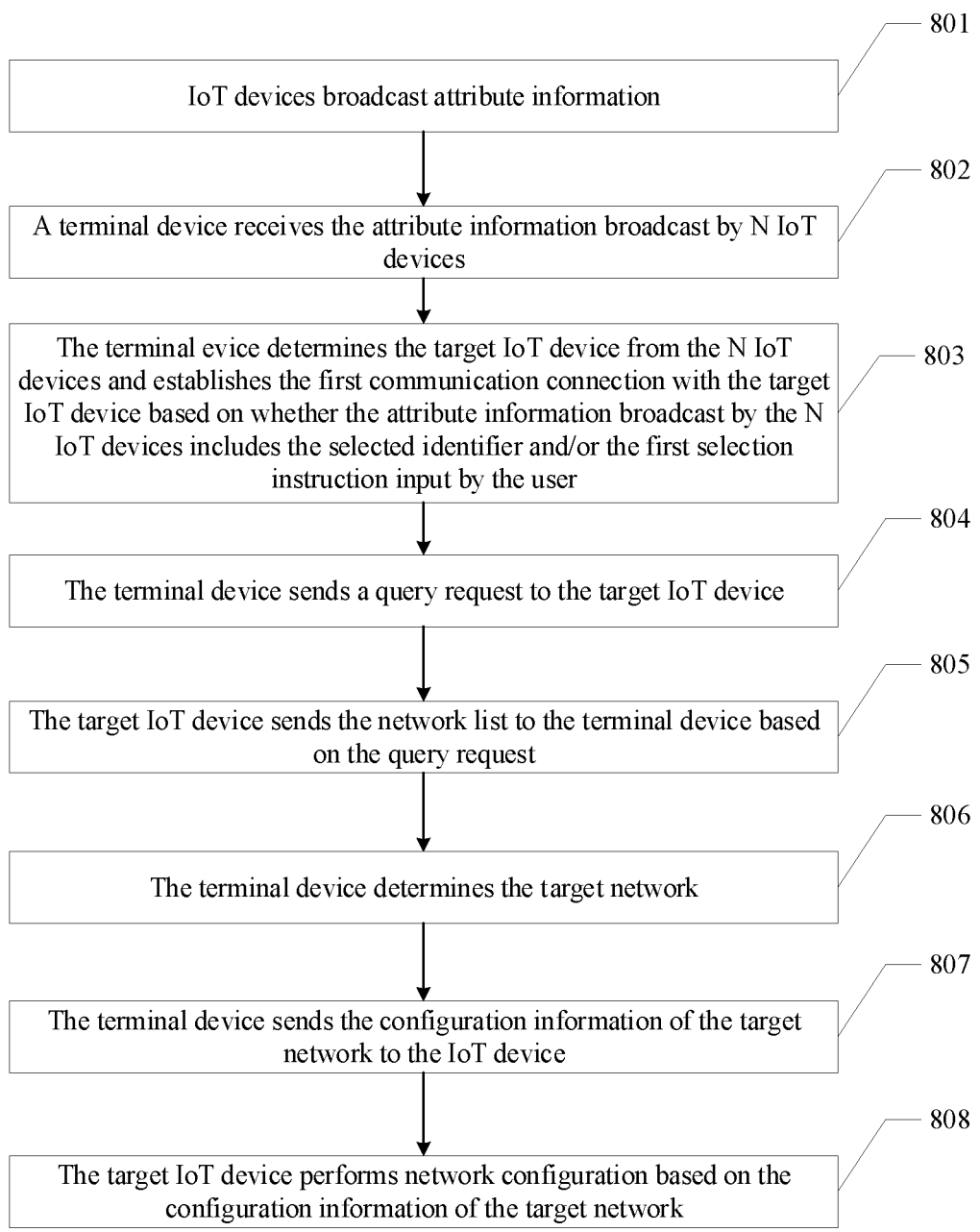
FIG. 8 is another flowchart of the network configuration method for IoT devices according to an embodiment of the present disclosure.

FIG. 8 is another flowchart of the network configuration method for IoT devices according to an embodiment of the present disclosure. The network configuration method will be described in detail below.

801, the IoT device broadcasts attribute information.

The process at 801 is similar to the process at 701 in FIG. 7, which has been described in detail above, and will not be repeated here.

802, the terminal device receives the attribute information broadcasted by N IoT devices.

803, the terminal device determines the target IoT device from the N IoT devices and establishes the first communication connection with the target IoT device based on whether the attribute information broadcasted by the N IoT devices includes the selected identifier and/or the first selection instruction input by the user.

The processes at 802 and 803 are similar to the processes at 101 to 103 in FIG. 1 and the processes at 501 to 503 in FIG. 5, which have been described in detail above, and will not be repeated here.

804, the terminal device sends a query request to the target IoT device.

It should be noted that the process at 804 is similar to the process at 104 in FIG. 1, which has been described in detail above, and will not be repeated here.

805, the target IoT device sends the network list to the terminal device based on the query request.

The process at 805 is similar to the process at 704 in FIG. 7, which has been described in detail above, and will not be repeated here.

806, the terminal device determines the target network.

807, the terminal device sends the configuration information of the target network to the IoT device.

The processes at 806 and 807 are similar to the processes at 105 to 106 in FIG. 1, which have been described in detail above, and will not be repeated here.

808, the target IoT device performs network configuration based on the configuration information of the target network.

The process at 808 is similar to the process at 705 in FIG. 7, which has been described in detail above, and will not be repeated here.

Therefore, it can be seen that in the embodiments of the present disclosure, when there are multiple devices that need to be networked, the terminal device can determine the target IoT device from the N IoT devices based on whether the attribute information broadcasted by the N IoT devices includes the selected identifier and/or the first selection instruction input by the user. As such, the device that needs to be configured first can be quickly determined, thereby reducing the complexity of network configuration of the IoT device, and improving the efficiency of network configuration.

The foregoing description describes the network configuration method of the IoT devices from the perspective of the interaction between the terminal device and the IoT devices. The following description describe the present disclosure from the perspective of the terminal device and the IoT devices.

Figure 9:
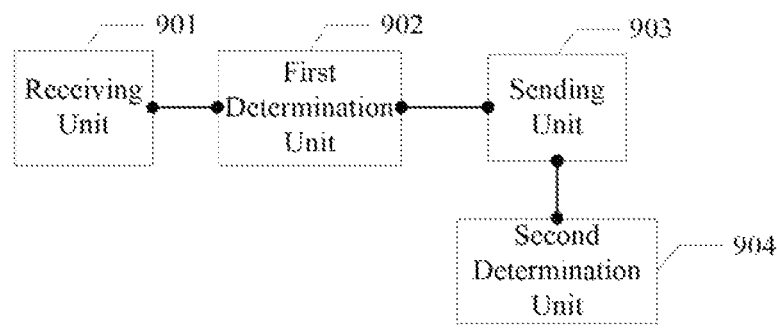
FIG. 9 is a block diagram of a terminal device according to an embodiment of the present disclosure.

FIG. 9 is a structural block diagram of a terminal device according to an embodiment of the present disclosure. The terminal device includes a receiving unit 901 configured to receive attribute information broadcasted by N IoT devices. N may be a positive integer greater than or equal to two. The attribute information broadcasted by the N IoT devices may include the network configuration state. The network configuration state of each IoT device in the N IoT devices may be in the network to-be-configured state.

The terminal device includes a first determination unit 902 configured to select the target IoT device from the N IoT devices based on whether the attribute information broadcasted by the N IoT devices includes the selected identifier and/or the first selection instruction input by the user, and establish the first communication connection with the target IoT device. In some embodiments, the attribute information including the selected identifier may be sent by the IoT device preferentially selected by the user.

The terminal device includes a sending unit 903 configured to send a query request to the target IoT device so that the target IoT device returns a network list corresponding to the target IoT device.

The terminal device includes a second determination unit 904 configured to determine a target network, the target network being listed in the network list.

The sending unit 903 may be further configured to send configuration information of the target network to the target IoT device so that the target IoT device performs network configuration based on the configuration information of the target network.

In some embodiments, the first determination unit 902 determining the target IoT device from the N IoT devices based on whether the attribute information broadcasted by the N IoT devices includes the selected identifier may include determining the IoT device corresponding to the target attribute information as the target IoT device when the target attribute information that includes the selected identifier exists in the attribute information of the N IoT devices (i.e., when the terminal device determines that the target attribute information is included in the attribute information of the N IoT devices).

In some embodiments, the first determination unit 902 may be further configured to show the N IoT devices to the user when the target attribute information that includes the selected identifier does not exist in the attribute information of the N IoT devices (i.e., when the terminal device determines that the attribute information of the N IoT devices does not include the target attribute information), receive the first selection instruction, and respond to the first selection instruction and determine the target IoT device based on the first selection instruction.

In some embodiments, the first determination unit 902 may be further configured to display the N IoT devices when the target attribute information that includes the selected identifier does not exist in the attribute information of the N IoT devices (i.e., when the terminal device determines that the attribute information of the N IoT devices does not include the target attribute information), output a prompt message for prompting the user to perform a selection on a prioritized IoT device to be configured, and output the IoT device prioritized by the user when the first selection instruction is not received in a predetermined period of time and there are two or more devices of the same device type in the N IoT devices.

In some embodiments, the attribute information of the N IoT devices may include, but is not limited to, device type and device identifier.

In some embodiments, the terminal device may further include a determination unit configured to determine whether the target IoT device is bound to an associated account; determine whether the associated account bound to the target IoT device matches the current account when the target IoT device is bound to the associated account; send a first prompt message when the associated account bound to the target IoT device matches the current account, the first prompt message may be used to indicate whether to perform a reset operation on the target IoT device; and send a second prompt message when the associated account bound to the target IoT device does not match the current account, the second prompt message may be used to instruct to perform a reset operation on the target IoT device.

Figure 10:
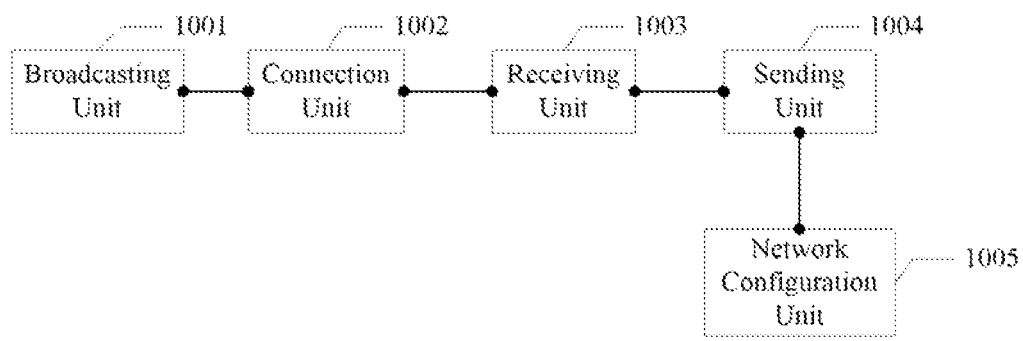
FIG. 10 is a block diagram of an IoT device according to an embodiment of the present disclosure.

FIG. 10 is a structural block diagram of a an IoT device according to an embodiment of the present disclosure. The IoT device includes a broadcasting unit 1001 configured to broadcast the attribute information, the attribute information including the network configuration state, and the network configuration state of the IoT device being the network to-be-configured state; a connection unit 1002 configured to establish a first communication connection with the terminal device; a receiving unit 1003 configured to receive a query request sent by the terminal device; a sending unit 1004 configured to send a network list to the terminal device based on the query request to initiate the terminal device to determine a target network, and return configuration information of the target network, the network list corresponding to the IoT device, and the target network being listed in the network list; and a network configuration unit 1005 configured to receive the configuration information of the target network returned by the terminal device, and perform network configuration based on the configuration information of the target network.

In some embodiments, the receiving unit 1003 may be further configured to receive the first operation instruction.

In some embodiments, the IoT device may further include a determination unit configured to add the selected identifier to the attribute information based on the first operation instruction to obtain the target attribute information, the IoT device corresponding to the target attribute information being the IoT device preferentially selected by the user.

In some embodiments, the broadcasting unit 1001 may be further configured to broadcast the target attribute information.

In some embodiments, the attribute information may include, but is not limited to, device type and device identifier.

In some embodiments, the receiving unit 1003 may be further configured to receive a second operation instruction when the network configuration state of the IoT device is the network-configured state, the second operation instruction may be used to adjust the network configuration state of the IoT device.

In some embodiments, the IoT device may further include a first adjustment unit configured to respond to the second operation instruction and adjust the network configuration state of the IoT device to the network to-be-configured state.

In some embodiments, the IoT device may further include a second adjustment unit configured to adjust the network configuration state of the IoT device to the network-configured state when the network configuration of the IoT device is successful.

Figure 11:
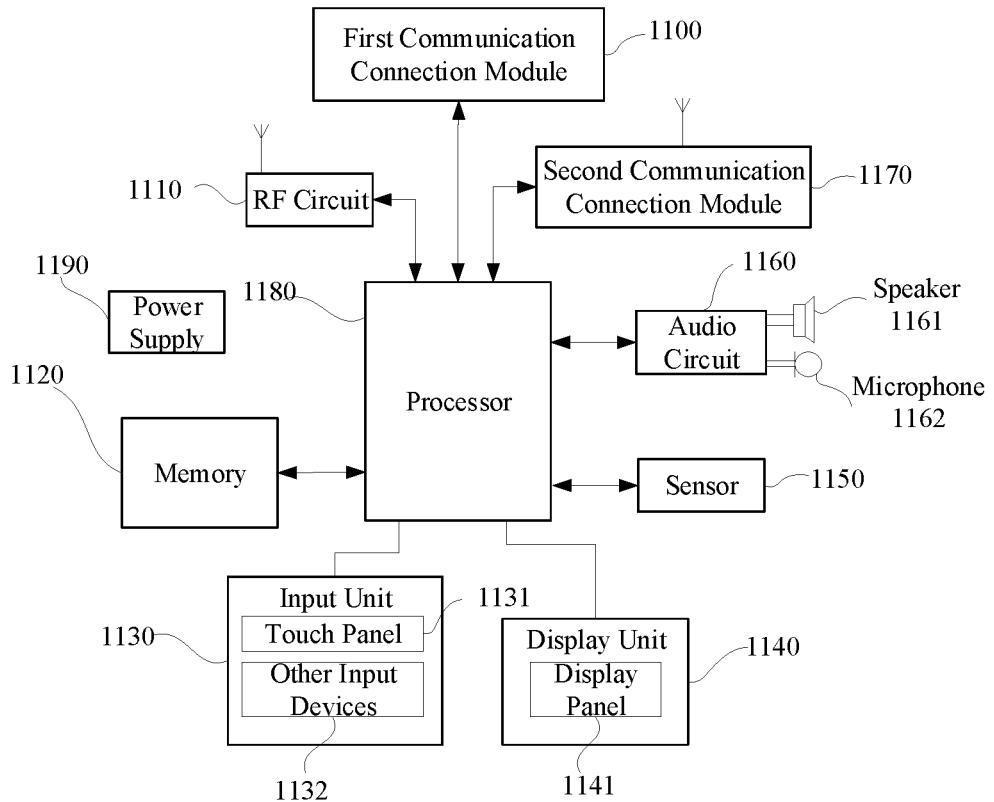
FIG. 11 is a schematic diagram of a hardware structure of the terminal device according to an embodiment of the present disclosure.

An embodiment of the present disclosure further provides another network configuration device of the IoT devices. As shown in FIG. 11, for the ease of description, only the parts related to the embodiments of the present disclosure are shown. For specific technical details that are not described, reference may be made to the method embodiments of the present disclosure. The network configuration device of the IoT devices may be any terminal device including a mobile phone, a tablet, a personal digital assistant (PDA), a point of sales (POS), an on-board computer, etc. Take the mobile phone as an example of the network configuration device of the IoT devices.

FIG. 11 is a schematic diagram of a hardware structure of the terminal device according to an embodiment of the present disclosure. Referring to FIG. 11, the mobile phone includes a processor 1180, a memory 1120, a first communication connection module 1100 (such as a Zigbee module, an infrared module, Bluetooth mode, etc.), and a second communication connection module 1170 (such as a Wi-Fi module). In some embodiments, the mobile phone may further include a radio frequency (RF) circuit 1110, an input unit 1130, a display unit 1140, a sensor 1150, an audio circuit 1160, and a power supply 1190. Those skilled in the art can understand that the structure of the mobile phone shown in FIG. 11 does not constitute a limitation on the mobile phone, and may include more or less components than shown in FIG. 11, or a combination of some components, or a different component arrangement.

The components of the mobile phone will be described in detail below with reference to FIG. 11.

In some embodiments, the RF circuit 1110 may be configured to receive and send signals in the process of sending and receiving information or talking. More specifically, after receiving the downlink information of the base station, the RF circuit 1110 may send the received information to the processor 1180 for further processing. In addition, the RF circuit 1110 may send the uplink data to be base station. Generally, the RF circuit 1110 may include, but is not limited to, an antenna, one or more amplifiers, a transceiver, a coupler, a low noise amplifier (LNA), a duplexer, etc. In addition, the RF circuit 1110 may also communicate with a network and other devices through wireless communication. The wireless communication may use any communication standard or protocol, including but not limited to, global system of mobile communication (GSM), general packet radio service (GPRS), code division multiple access (CDMA), wideband code division multiple access (WCDMA), long term evolution (LTE), email, or short message service (SMS), etc.

The memory 1120 may be configured to store a software program and a module. The processor 1180 can execute the software program and the module that are stored in the memory 1120, to perform various function applications and data processing of the mobile phone. The memory 1120 may include a program storage area and a data storage area. The program storage area may store an operating system, an application program required by at least one function (such as a sound playing function and an image playing function), and the like. The data storage area may store data (such as audio data and an address book) created based on the use of the mobile phone, and the like. In addition, the memory 1120 may include a high-speed random access memory, and may also include a non-volatile memory, such as one or more magnetic disks storage devices, flash storage devices, or other volatile solid-state storage devices.

The input unit 1130 may be configured to receive input digit or character information, and generate a key signal input related to a user setting and function control of the mobile phone. More specifically, the input unit 1130 may include a touch panel 1131 and other input devices 1132. The touch panel 1131, also referred to as a touchscreen, may collect a touch operation of the user on or near the touch panel 1131 (such as an operation of the user on or near the touch panel 1131 by using any suitable object or accessory such as a finger or a stylus), and drive a corresponding connection device based on a preset program. In some embodiments, the touch panel 1131 may include two parts: a touch detection device and a touch controller. The touch detection device can detect a touch position of the user, detect a signal generated by the touch operation, and transfer the signal to the touch controller. The touch controller can receive the touch information from the touch detection device, convert the touch information into touch point coordinates, and then send the touch point coordinates to the processor 1180. Moreover, the touch controller can receive and execute a command sent by the processor 1180. In addition, the touch panel 1131 may be of a resistive type, a capacitive type, an infrared type, a surface acoustic wave type, or the like. In addition to the touch panel 1131, the input unit 1130 may further include other input devices 1132. More specifically, the other input devices 1132 may include, but is not limited to, one or more of a physical keyboard, a functional button (such as a sound volume control button or a power button), a trackball, a mouse, or a joystick.

The display unit 1140 may be configured to display information input by the user or information provided to the user, and various menus of the mobile phone. The display unit 1140 may include a display panel 1141. In some embodiments, the display panel 1141 may be configured in a form of a liquid crystal display (LCD), an organic light-emitting diode (OLED), or the like. Further, the touch panel 1131 may cover the display panel 1141. After detecting a touch operation on or near the touch panel 1131, the touch panel 1131 may transfer the touch operation to the processor 1180 to determine the type of the touch event. Subsequently, the processor 1180 may provide a corresponding visual output on the display panel 1141 based on the type of the touch event. Although in FIG. 11, the touch panel 1131 and the display panel 1141 are used as two separate components to implement input and input functions of the mobile phone, in some embodiments, the touch panel 1131 and the display panel 1141 may be integrated to implement the input and output functions of the mobile phone.

The mobile phone may further include one or more sensors 1150, such as a light sensor, a motion sensor, and another sensor. More specifically, the light sensor may include an ambient light sensor and a proximity sensor. The ambient light sensor may adjust the brightness of the display panel 1141 according to luminance of ambient light, and the proximity sensor may disable the display panel 1141 and/or backlight when the mobile phone approaches an ear. As a type of motion sensor, the acceleration sensor can detect a value of an acceleration in each direction (generally three axes), and detect a value and a direction of gravity when the acceleration sensor is static, and may be applicable to an application for recognizing the attitude of the mobile phone (for example, switching between a landscape screen and a portrait screen, related games, and magnetometer attitude calibration), a function related to vibration recognition (such as a pedometer or a knock), and the like. Other sensors such as a gyroscope, a barometer, a hygrometer, a thermometer, and an infrared sensor may also be disposed on the mobile phone. Details are not described herein.

The audio circuit 1160, a speaker 1161, and a microphone 1162 may provide an audio interface between the user and the terminal device. The audio circuit 1160 may transmit, to the speaker 1161, an electrical signal obtained after a conversion of received audio data, and the speaker 1161 can convert the electrical signal into an acoustic signal and outputs the acoustic signal. In addition, the microphone 1162 can convert a collected acoustic signal into an electrical signal, the audio circuit 1160 can receive and convert the electrical signal into audio data, and output the audio data to the processor 1180 for processing, and then processed audio data can be sent to, for example, another mobile phone, by using the RF circuit 1110, or the audio data can be output to the memory 1120 for further processing.

Wi-Fi belongs to a short distance wireless transmission technology. The mobile phone may help, by using the Wi-Fi module 1170, a user receive and send an email, browse a web page, and access streaming media, and the like. This provides wireless broadband Internet access for the user. Although FIG. 11 shows the Wi-Fi module 1170, it may be understood that the Wi-Fi module 1170 is not a mandatory component of the mobile phone, and when required, the Wi-Fi module 1170 may be omitted provided that the scope of the essence of the present disclosure is not changed.

The processor 1180 is a control center of the mobile phone, which is connected to each part of the entire mobile phone by using various interfaces and lines, and performs various functions of the mobile phone and data processing by running or executing the software program and/or the module that are/is stored in the memory 1120 and invoking data stored in the memory 1120, to perform overall monitoring on the mobile phone. In some embodiments, the processor 1180 may include one or more processing units. In some embodiments, an application processor and a modem processor may be integrated into the processor 1180, where the application processor mainly processes an operating system, a user interface, an application program, and the like, and the modem processor mainly processes wireless communication. It may be understood that the foregoing modem processor may alternatively not be integrated into the processor 1180.

The mobile phone further includes the power supply 1190 (for example, a battery) configured to supply power to the various components of the mobile phone. In some embodiments, the power supply may be logically connected to the processor 1180 by using a power management system, to implement functions, such as functions such as charging, discharging, and power consumption management can be managed through the power management system.

Although not shown in FIG. 11, the mobile phone may further include a camera and the like, and details are not described herein.

In the embodiments of the present disclosure, the processor 1180 included in the mobile phone may also perform operations performed by the terminal device in the embodiments shown in FIG. 1 to FIG. 8.

Figure 12:
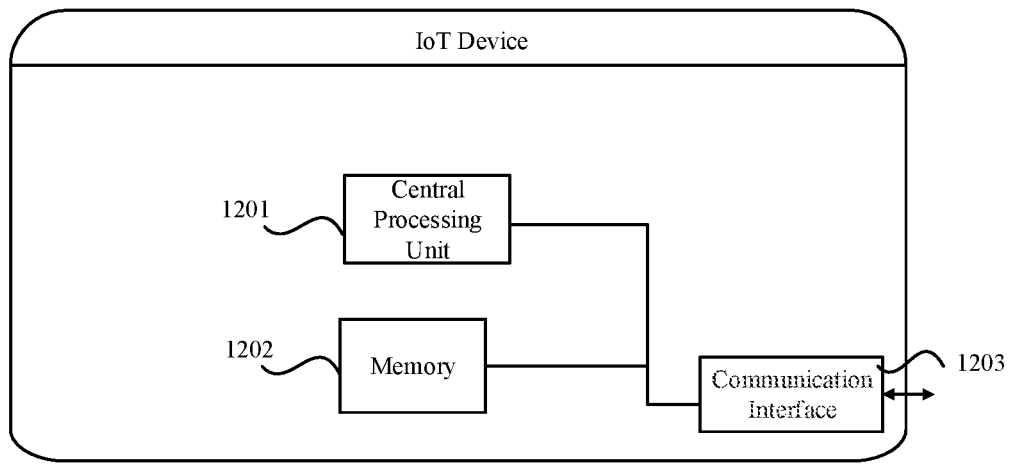
FIG. 12 is a schematic diagram of a hardware structure of the IoT device according to an embodiment of the present disclosure.

Referring to FIG. 12, the IoT device in the present disclosure includes one or more central processing units 1201, a memory 1202, and a communication interface 1203. In some embodiments, the central processing unit 1201, the memory 1202, and the communication interface 1203 may be connected to each other through a bus. The communication interface 1203 may include a first communication connection module (e.g., a Zigbee module, an infrared module, a Bluetooth module, etc.) and a second communication connection module (e.g., a Wi-Fi module). The IoT devices and the terminal device may establish a first communication connection through the first communication module, and the IoT devices may communication with another device through the second communication module.

The memory 1202 can be a short-term storage or a long-term storage, and can be configured to store related instructions and data. The communication interface 1203 can be configured to receive and send data. Further, the central processing unit 1201 can be configured to communicate with the memory 1202, and execute a series of instruction operations in the memory 1202, such as the operations performed by the IoT device in the embodiments shown in FIG. 1 to FIG. 8.

The IoT devices in the foregoing embodiments may be based on the structure shown in FIG. 12.

In the above embodiments, the descriptions of the various embodiments focus on different aspects, and for the parts that are not detailed described in a certain embodiment, reference can be made to the related descriptions of other embodiments.

It can be appreciated by those skilled in the art that for the specific working process of the system, the apparatus, and the module described above, reference can be made to the corresponding process in the foregoing embodiments of the method, and the details description is omitted herein for the convenience and brevity of the description.

The present disclosure is described with reference to the flowcharts and/or block diagrams of the method, the device (system), and the computer program product according to the implementations of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computer device includes one or more processors (CPU), an input/output interface, a network interface, and a memory.

The memory may include forms such as a non-persistent storage in a computer readable medium, a random access memory (RAM) and/or a non-volatile memory, such as a read-only memory (ROM) or a flash memory (flash RAM). The memory is an example of the computer readable medium.

The computer readable medium includes a persistent and a non-persistent, a removable and a non-removable medium, which implement information storage by using any method or technology. Information may be a computer readable instruction, a data structure, a module of a program or other data. Examples of a storage medium of a computer include, but are not limited to: a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc-read only memory (CD-ROM), a digital versatile disc (DVD) or another optical storage device, a cassette tape, disk and tape memory or another magnetic storage device, or any other non-transmission media, which may be configured to store information that can be accessed by a computer device. According to limitations of the present specification, the computer readable medium does not include a non-transitory medium (transitory media), such as a modulated data signal and a modulated carrier.

It should be further noted that, the terms "include", "comprise", or their any other variant is intended to cover a non-exclusive inclusion, so that a process, a method, a product, or an apparatus that includes a list of elements not only includes those elements but also includes other elements which are not expressly listed, or further includes elements inherent to such process, method, product, or apparatus. An element preceded by "includes a . . . " does not, without more constraints, preclude the existence of additional identical elements in the process, method, product, or apparatus that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application may use a form of a computer program product that is implemented on one or more computer-usable storage media (including but not limited to a disk memory, a CD-ROM, an optical memory, and the like) that include computer usable program code.

The previous descriptions are merely implementations of the present application, and are not used to limit the present application. Various changes and modifications can be made to the present application by those skilled in the art. Any modification, equivalent replacement, or improvement made without departing from the spirit and principle of the present application shall fall within the scope of the claims of the present application.

What is claimed is:

1. A network configuration method for an Internet of Things (IoT) device, implemented by a terminal device, comprising:

receiving attribute information broadcasted by N IoT devices, N being an integer greater than 1, the attribute information broadcasted by the N IoT devices including a network configuration state, the network configuration state of each of the N IoT devices being a network to-be-configured state, the network to-be-configured state indicating that each of the N IoT devices is waiting to be configured and connected to a network;

determining whether the attribute information broadcasted by the N IoT devices includes a selected identifier, wherein the selected identifier is included in attribute information broadcasted by an IoT device prioritized by a user over the N IoT devices;

in response to determining that the attribute information broadcast by the N IoT devices includes the selected identifier, determining an IoT device whose attribute information includes the selected identifier as a target IoT device;

in response to determining that the attribute information broadcast by the N IoT devices does not include the selected identifier, displaying the N IoT devices to the user and determining the target IoT device based on a first selection instruction input by the user;

establishing a first communication connection with the target IoT device, wherein the target device is either the IoT device whose attribute information includes the selected identifier or selected based on the first selection instruction;

sending a query request to the target IoT device to have the target IoT device return a network list corresponding to the target IoT device, the network list including one or more wireless networks available to the target IoT device;

determining a target network from the network list based on network signal strength on the target IoT device or user selection; and sending configuration information of the target network to the target IoT device and instructing the target IoT device to perform network configuration based on the configuration information of the target network.

2. The method of claim 1, further comprising:

showing the N IoT devices to the user when the terminal device determines that the attribute information of the N IoT devices does not include the target attribute information; and when the terminal device does not receive the first selection instruction within a predetermined period of time and two or more devices of a same device type exist in the N IoT devices, outputting a prompt message for prompting the user to perform a selection on a prioritized IoT device to be configured, and determining the IoT device prioritized by the user.

3. The method of claim 1, wherein:
the attribute information of each of the N IoT devices includes a device type and a device identifier.

4. A network configuration method implemented by an IoT device, comprising:
broadcasting attribute information of the IoT device, the attribute information including a network configuration state, the network configuration state of the IoT device being a network to-be-configured state, the network to-be-configured state indicating that each of the N IoT devices is waiting to be configured and connected to a network;
establishing a first communication connection with a terminal device, wherein either the broadcasted attribute information of the IoT device includes a selected identifier or the IoT device is selected based on a first selection instruction on the terminal device;
receiving a query request sent by the terminal device;
sending a network list corresponding to the IoT device to the terminal device based on the query request to initiate the terminal device to determine a target network from the network list based on network signal strength on the IoT device or user selection, the network list including one or more wireless networks available to the IoT device; and
receiving configuration information of the target network returned by the terminal device, and performing network configuration based on the configuration information of the target network.

5. The method of claim 4, further comprising:
receiving a first operation instruction;
adding the selected identifier to the attribute information based on the first operation instruction to obtain target attribute information, an IoT device corresponding to the target attribute information being the IoT device prioritized by a user; and
broadcasting the target attribute information.

6. The method of claim 4, wherein before broadcasting the attribute information, further comprising:
receiving a second operation instruction when the network configuration state of the IoT device is a network-configured state, the second operation instruction being used to adjust the network configuration state of the IoT device; and
responding to the second operation instruction and adjusting the network configuration state of the IoT device to the network to-be-configured state.

7. A terminal device comprising:
one or more processors; and
a memory storing program instructions that, when being executed by the one or more processors, cause the one or more processors to:
receive attribute information broadcasted by N IoT devices, N being an integer greater than one, the attribute information broadcasted by the N IoT devices including a network configuration state, the network configuration state of each of the N IoT devices being a network to-be-configured state, the network to-be-configured state indicating that each of the N IoT devices is waiting to be configured and connected to a network;
determine whether the attribute information broadcasted by the N IoT devices includes a selected identifier, wherein the selected identifier is included in attribute information broadcasted by an IoT device prioritized by a user over the N IoT devices;
in response to determining that the attribute information broadcast by the N IoT devices includes the selected identifier, determine an IoT device whose attribute information includes the selected identifier as a target IoT device;
in response to determining that the attribute information broadcast by the N IoT devices does not include the selected identifier, display the N IoT devices to the user and determining the target IoT device based on a first selection instruction input by the user;
establish a first communication connection with the target IoT device, wherein the target device is either the IoT device whose attribute information includes the selected identifier or selected based on the first selection instruction;
send a query request to the target IoT device to have the target IoT device return a network list corresponding to the target IoT device, the network list including one or more wireless networks available to the target IoT device;
determine a target network from the network list based on network signal strength on the target IoT device or user selection; and
send configuration information of the target network to the target IoT device and instructing the target IoT device to perform network configuration based on the configuration information of the target network.

8. The terminal device of claim 7, wherein the program instructions further cause the one or more processors to:
show the N IoT devices to the user when the terminal device determines that the attribute information of the N IoT devices does not include the target attribute information; and
output a prompt message for prompting the user to perform a selection on a prioritized IoT device to be configured, and determining the IoT device prioritized by the user when the first selection instruction is not received within a predetermined period of time and two or more device of a same device type exist in the N IoT devices.

9. The terminal device of claim 7, wherein:
the attribute information of each of the N IoT devices includes a device type and a device identifier.

10. An IoT device, comprising:
one or more processors; and
a memory storing program instructions that, when being executed by the one or more processors, cause the one or more processors to:
broadcast attribute information of the IoT device, the attribute information including a network configuration state, and the network configuration state of the IoT devices being a network to-be-configured state, the network to-be-configured state indicating that each of the N IoT devices is waiting to be configured and connected to a network;
establish a first communication connection with a terminal device, wherein either the broadcasted attribute information of the IoT device includes a selected identifier or the IoT device is selected based on a first selection instruction on the terminal device;
receive a query request sent by the terminal device;
send a network list corresponding to the IoT device to the terminal device based on the query request to initiate the terminal device to determine a target network from the network list based on network signal strength on the IoT device or user selection, the network list including one or more wireless networks available to the IoT device; and receive configuration information of the target network returned by the terminal device, and perform network configuration based on the configuration information of the target network.

11. The IoT device of claim 10, wherein the program instructions further cause the one or more processors to:

receive a first operation instruction;

add the selected identifier to the attribute information based on the first operation instruction to obtain target attribute information, an IoT device corresponding to the target attribute information being the IoT device prioritized by a user; and broadcast the target attribute information.

12. The IoT device of claim 10, wherein the program instructions further cause the one or more processors to:

receive a second operation instruction when the network configuration state of the IoT device is a network-configured state, the second operation instruction being used to adjust the network configuration state of the IoT device; and respond to the second operation instruction and adjust the network configuration state of the IoT device to the network to-be-configured state.

13. The method of claim 1, wherein:

the attribute information broadcasted by the target device is received by the terminal device using a first communication connection technology; and the one or more wireless networks available to the target IoT device use a second communication connection technology different from the first communication connection technology.

14. The method of claim 1, wherein:

the configuration information of the target network includes a network identifier and a network password.

15. The method of claim 1, further comprising:

determining that the target IoT device is bound to an associated account;

determining whether the associated account matches a current account of the terminal device;

when the associated account matches the current account, prompting the user whether to perform a reset operation on the target IoT device; and when the associated account does not match the current account, prompting the user to perform a reset operation on the target IoT device if the user wants to continue the network configuration for the target IoT device.

* * * * *